United States Patent
Kawano

(10) Patent No.: US 9,106,792 B2
(45) Date of Patent: Aug. 11, 2015

(54) CONFERENCE SUPPORTING SYSTEM, CONTROL APPARATUS AND INPUT TERMINAL

(71) Applicant: KONICA MINOLTA, INC., Chiyoda-ku (JP)

(72) Inventor: Tatsuya Kawano, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 64 days.

(21) Appl. No.: 14/016,653

(22) Filed: Sep. 3, 2013

(65) Prior Publication Data

US 2014/0063179 A1    Mar. 6, 2014

(30) Foreign Application Priority Data

Sep. 5, 2012   (JP) .................................. 2012-194826

(51) Int. Cl.
  *H04N 7/15*   (2006.01)
  *H04L 29/06*  (2006.01)
  *G06F 21/60*  (2013.01)

(52) U.S. Cl.
  CPC ................ *H04N 7/15* (2013.01); *G06F 21/606* (2013.01); *H04L 65/1089* (2013.01); *H04L 65/403* (2013.01); *H04L 65/4015* (2013.01)

(58) Field of Classification Search
  CPC .. H04L 65/403; H04L 65/4015; G06F 21/606
  USPC .......................... 348/14.08; 370/260; 709/204
  See application file for complete search history.

(56) References Cited

U.S. PATENT DOCUMENTS 6,256,649 B1 * 7/2001 Mackinlay et al. ............ 715/212
6,584,479 B2 * 6/2003 Chang et al. ................... 715/205
7,188,306 B1 * 3/2007 Chang et al. ................... 715/205

(Continued)

FOREIGN PATENT DOCUMENTS

JP       08-307842 A    11/1996
JP     2006-303742 A    11/2006

(Continued)

OTHER PUBLICATIONS

Office Action issued on Oct. 31, 2014, by the Japanese Patent Office in corresponding Japanese Patent Application No. 2012-194826, and an English Translation of the Office Action. (8 pages).

*Primary Examiner* — Creighton Smith
(74) *Attorney, Agent, or Firm* — Buchanan Ingersoll & Rooney PC

(57) ABSTRACT

A conference supporting system includes plural input terminals and a control apparatus connected through a network. Each input terminal includes a processor and a display screen configured to allow a user to perform handwriting input thereon and to display the data. The processor of each input terminal is configured to perform making a user to choose who acquires an access right, making a request to acquire the access right to the control apparatus, and transmitting handwriting data to the control apparatus. The processor of the control apparatus is configured to perform granting an access right of a part or whole of the area determined by the user, giving one of the input terminals a notice about the granted access right, transmitting the handwriting data to other input terminals and operating the display screen of each of the other input terminals to display the handwriting data.

17 Claims, 14 Drawing Sheets

(56) References Cited

U.S. PATENT DOCUMENTS

| | | |
|---|---|---|
| 8,487,879 B2 * | 7/2013 | Kim et al. .................... 345/173 |
| 2004/0139052 A1 * | 7/2004 | Kazushige et al. ............... 707/1 |
| 2005/0021518 A1 * | 1/2005 | Snowdon et al. ................ 707/7 |
| 2005/0223315 A1 * | 10/2005 | Shimizu et al. ............... 715/512 |
| 2010/0199191 A1 | 8/2010 | Takahashi |
| 2013/0301921 A1 * | 11/2013 | Zhang et al. ................. 382/187 |
| 2014/0063179 A1 * | 3/2014 | Kawano .................... 348/14.08 |

FOREIGN PATENT DOCUMENTS

| | | |
|---|---|---|
| JP | 2010-181978 A | 8/2010 |
| JP | 2010-267218 A | 11/2010 |
| WO | WO 2008/132977 A1 | 11/2008 |

* cited by examiner

CONFERENCE SUPPORTING SYSTEM, CONTROL APPARATUS AND INPUT TERMINAL

This application is based on Japanese Patent Application No. 2012-194826 filed on Sep. 5, 2012, in the Japan Patent Office, the entire content of which is hereby incorporated by reference.

TECHNICAL FIELD

The present invention relates to a conference supporting system in which information provided by a handwriting input is shared among a plurality of input terminals and is displayed on each of the plurality of input terminals, a control apparatus configured to control a handwriting input performed in an input terminal, and an input terminal configured to perform a handwriting input thereon.

BACKGROUND

Various conference supporting systems are proposed so as to share a document screen among a plurality of terminals and to be used in a conference such that each user inputs notes on the terminal by handwriting during the conference. In such a conference supporting system, when two or more handwriting inputs are performed simultaneously on the same area in the document screen via a plurality of terminals, two or more pieces of information inputted by handwriting are displayed so as to overlap with each other on the same area, which lowers the readability of them. Further, in order to prevent a self terminal and other terminals from performing respective handwriting inputs simultaneously, it is required to perform a handwriting input on the self terminal while confirming the timing and area of each of handwriting inputs performed by the other terminals at every time. Accordingly, smooth discussion and information exchange in a conference are disturbed.

For such problems, for example, WO 2008/132977 discloses an image editing apparatus which includes an input section which inputs information with regard to at least an existing object or a new object; a display section which displays at least the existing object or the new object; an overlap detecting section which detects an overlap between the existing object and the new object; a selecting section which selects whether or not to overlap the existing object and the new object; and a moving section which moves the existing object to the outside of the area of the new object so as to make the existing object not to overlap the new object based on the information input by the input section.

Further, Japanese Unexamined Patent Publication (JP-A) No. 2010-267218 discloses a conference supporting system which includes a plurality of terminal units and an exclusive control apparatus. The conference supporting system is configured to enable each of the plurality of terminal units and the exclusive control apparatus to perform mutual transmission and reception of data to be written in a display page where conference material data is displayed. The conference supporting system is further constituted as follows. That is, each of the plurality of terminal units includes a requesting section and a display section. The requesting section is configured to determine partially an area in a display page which is displayed on the self terminal unit and shows the conference material data and to make a request for write permission to the area to the exclusive control apparatus. The display section is configured to display the data transmitted from the exclusive control apparatus on the display page of the conference material data out of various write data transmitted to the exclusive control apparatus from the input terminals. The exclusive control apparatus includes a request receiving section, an exclusive control section and a transmission control section. The request receiving section is configured to receive the request for the write permission from each of the terminal units. The exclusive control section is configured to grant the write permission to the terminal unit making the request under the condition that the area determined in the request for the write permission does not overlap with other areas whose write permissions have already been granted to other terminal units than the terminal unit making the request, and is configured not to grant the write permission to the terminal unit making the request under the condition that those areas overlap together. The transmission control section is configured to confirm the data received from the plural terminal units, transmit the received data to the plural terminal units under the condition that the received data are write data transmitted from the terminal unit which has write permission of the area whose write permission has been granted, and forbid the data from being transmitted to the plural terminal units under the condition that the received data are data from a terminal unit other than the terminal unit having write permission of an area overlapping with the area whose write permission has been granted.

Furthermore, JP-A No. 2006-303742 discloses an electric device which includes a setting section, a display section, a control section and a communicating section. The setting section is configured to set two or more devices connectable to each other through a communication network as members of a group. The display section is configured to display a hoard on which data shared among the devices set as the members of the group are written. The control section is configured to write data inputted by a device having a specific right and selected from the devices set as the members of the group on the board and to update the data on the board. The communicating section is configured to distribute the data written on the board to each of the devices set as the members of the group.

With the technique of WO 2008/132977, when an existing object and a new object overlap with each other, the existing object is moved to the outside of the area of the new object. Therefore, the overlapping between the objects can be prevented. However, in this method, since the existing object may be moved against the intention of a user, which makes a problem that contents of the display screen intended by the user cannot be obtained.

Further, with the technique of JP-A No. 2010-267218, when the areas overlap with each other, the exclusive control is performed so as not to grant write permission to the terminal unit making the request for the write permission. Therefore, it is possible to prevent two or more terminal units from writing data into the same area. However, in this method, write permission is granted to only a single user for one area. Accordingly, the other users belonging to the same group cannot perform writing for the area, which makes a problem that discussion and information exchange cannot be performed efficiently. Further, in the case the determined areas overlap with each other, users are required to determine an area again to acquire the permission, which makes a problem that the operation becomes complicated.

Furthermore, with the technique of JP-A No. 2006-303742, the data written on the board are distributed to each of the devices set as the members of the group. Therefore, the data can be shared among the members. However, in the method, the writing on the board screen is limited to a user having write permission, and the other users cannot perform writing for the board unless the write permission is transferred thereto. Accordingly, there is a problem that discussion and information exchange cannot be performed efficiently. The present invention seeks to solve the problems.

SUMMARY

There are disclosed illustrative conference supporting systems, control apparatuses and input terminals.

An illustrative conference supporting system reflecting one aspect of the present invention is a conference supporting system comprising: a plurality of input terminals and a control apparatus. The plurality of input terminals are connected to a network for sharing data with each other and displaying data thereon, and each of the input terminals comprises a processor and a display screen configured to allow a user to perform a handwriting input thereon and to display the data. The control apparatus is connected to the plurality of the input terminals through the network and comprises a processor. The processor of each of the input terminals is configured to perform a right choosing process including: making a user of the each of the input terminals to choose the user or a group to which the user belongs, as an acquisitor of an access right of an area where a handwriting input is to be performed in the display screen. The processor of each of the input terminals is configured to perform a right acquiring process including: transmitting information about an area determined by the user and information about the access right chosen by the user to the control apparatus; and making a request to acquire the access right to the control apparatus. The processor of each of the input terminals is configured to perform a handwriting inputting process including: transmitting handwriting data which has been inputted in an area in the display screen to the control apparatus, where the area is an area whose access right has been acquired by the user or the group to which the user belongs. The processor of the control apparatus is configured to perform a right granting process including: comparing, in response to receiving the request to acquire the access right made by one of the input terminals, the area determined by the user and an area whose access right has already been acquired by another; granting an access right of a part or whole of the area determined by the user, where the part or whole of the area does not overlap with the area whose access right has already been acquired by another; and giving the one of the input terminals a notice that the access right of the part or whole of the area has been granted. The processor of the control apparatus is configured to perform a data distributing process including: transmitting the handwriting data transmitted from the one of the input terminals to other input terminals; and operating the display screen of each of the other input terminals to display the handwriting data.

An illustrative input terminal reflecting one aspect of the present invention is an input terminal to be connected to a network for sharing data with another input terminal and displaying the data thereon with being controlled by a control apparatus. The input terminal comprises a processor and a display screen configured to allow a user to perform handwriting input thereon and to display the data thereon. The processor is configured to perform a right choosing process including: making a user of the input terminals to choose the user or a group to which the user belongs, as an acquisitor of an access right of an area where a handwriting input is to be performed in the display screen. The processor is configured to perform a right acquiring process including: transmitting information about an area determined by the user and information about the access right chosen by the user to the control apparatus; and making a request to acquire the access right to the control apparatus. The processor is configured to perform a handwriting inputting process including: transmitting handwriting data which has been inputted in an area in the display screen to the control apparatus, where the area is an area whose access right has been acquired by the user or the group to which the user belongs.

An illustrative control apparatus reflecting one aspect of the present invention is a control apparatus to be connected to a plurality of input terminals through a network, where each of the input terminals includes a display screen configured to allow a user to perform handwriting input thereon and to display the data thereon. The control apparatus comprises a processor configured to perform the following processes. The processor is configured to perform a right granting process. The right granting process includes: receiving information about an area determined by a user of one of the input terminals and information about an access right chosen by the user, both being transmitted from the one of the input terminals, where the information about the access right is obtained by making the user to choose the user or a group to which the user belongs as an acquisitor of an access right of the area determined by the user. The right granting process further includes: comparing, in response to receiving the information about the area determined by the user and the information about the access right, the area determined by the user and an area whose access right has already been acquired by another; granting an access right of a part or whole of the area determined by the user, where the part or whole of the area does not overlap with the area whose access right has already been acquired by another; and giving the one of the input terminals a notice that the access right of the part or whole of the area has been granted. The processor is configured to perform a data distributing process including: receiving handwriting data which has been inputted in an area in the display screen of the one of the input terminals, where the area is an area whose access right has been acquired by the user or the group to which the user belongs; transmitting the handwriting data to other input terminals; and operating the display screen of each of the other input terminals to display the handwriting data.

Other features of illustrative embodiments will be described below.

BRIEF DESCRIPTION OF THE DRAWINGS

Embodiments will now be described, by way of example only, with reference to the accompanying drawings which are meant to be exemplary, not limiting, and wherein like elements numbered alike in several figures, in which.

DETAILED DESCRIPTION

Figure 1:
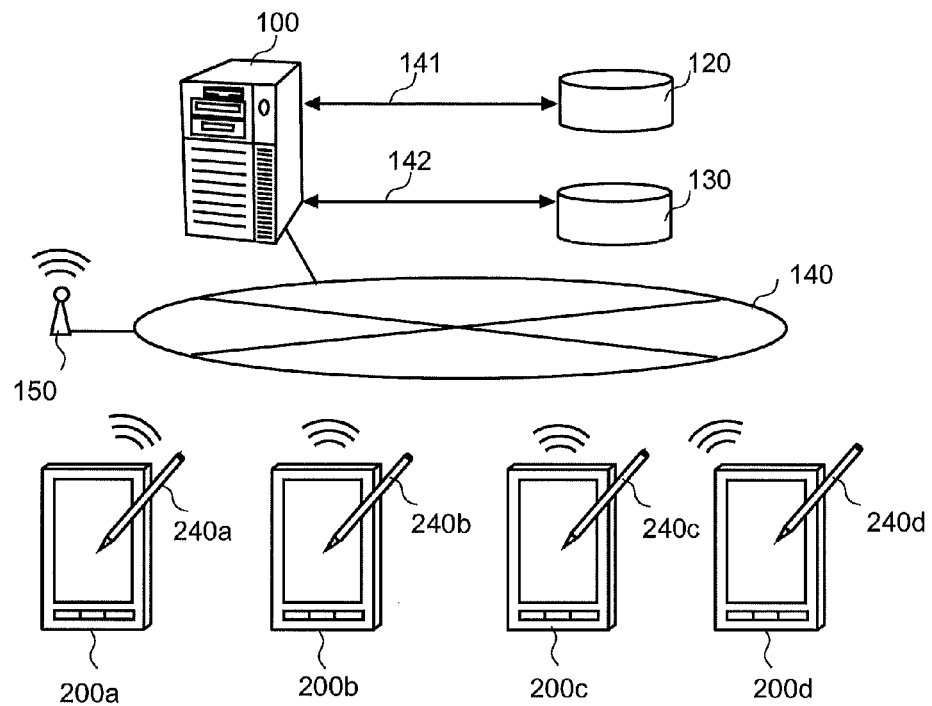
FIG. 1 is an illustration showing schematically a constitution of a conference supporting system pertaining to one embodiment of the present invention.

Illustrative embodiments of conference supporting systems, control apparatuses and input terminals will be described with reference to the drawings. It will be appreciated by those of ordinary skill in the art that the description given herein with respect to those figures is for exemplary purposes only and is not intended in any way to limit the scope of potential embodiments may be resolved by referring to the appended claims.

According to the illustrative conference supporting systems, control apparatuses, and input terminals as embodiments of the present invention, it becomes possible to prevent two or more pieces of handwriting information from overlapping each other beforehand and to enable discussion and information exchange to be performed efficiently.

The reasons are as follows. That is, the input terminal is configured to make a user to choose whether a user oneself acquires an access right of an area on the display screen on which a handwriting input is performed or a group to which the user belongs acquires the access right, and to make a request for a right acquisition to the control apparatus with transmitting the information about a determined area which the user determines and the information about the access right chosen by the user to the control apparatus. On the other hand, the control apparatus is configured, in response to receiving the request for the right acquisition, to compare the determined area with a right-acquired area an access right of which has been acquired by a person or a group other than the user, to grant an access right to the user or the group for a part or the whole of the determined area which does not overlap with the right-acquired area, to give a notice that the access right has been granted to the input terminal making the request, and, upon receipt of handwritten data which the user or the group inputs on the area whose access right has been acquired by the user or the group by handwriting from the input terminal, and to transmit the handwriting data to other input terminals so as to control the other input terminals to display the handwriting data on their display screens.

In this way, on an area whose access right has already been granted, only a user having acquired the access right of the area can perform a handwriting input. Accordingly, it becomes possible to prevent two or more pieces of information from overlapping with each other beforehand, and a user can obtain contents of a display screen as intended. Further, for a single area, it becomes possible to choose whether a user oneself acquires an access right or a group to which the user belongs acquires the access right. Accordingly, an area can be used differently in accordance with a situation, and discussion and information exchange can be performed efficiently.

As shown in the description about the background, in a scene where a conference is held via a plurality of terminals while documents and handwritten memos are shared among the plurality of terminals, when two or more handwriting inputs are performed simultaneously on the same area, two or more pieces of handwriting information are displayed so as to overlap each other on the same area, which lowers the readability of them. In order to avoid such a situation, it is required to perform a handwriting input on a self terminal while confirming the situation and area of each of handwriting inputs performed by the other terminals at every time, which makes another problem that smooth progress of a conference and information exchange are disturbed.

For such problems, as disclosed by WO 2008/132977, when the areas overlap with each other, it may be supposed to consider a method of moving an existing object. However, according to this method, since an object may be moved to a location which a user does not intend, a display screen intended by the user cannot be obtained. Further, as disclosed by JP-A Nos. 2010-267218 and 2006-303742, it may be supposed to consider a method for providing an access right to a single person of users for each of areas. However, according to this method, since the other users can no longer perform writing on the areas, efficient discussion and information exchange are disturbed.

Here, in the case where a plurality of users who do not know well each other hold a conference via their respective terminals, since it may be difficult to expect how a handwriting input is performed by each of users, it may be effective to provide the access right of each of areas separately to a single person of the users. On the other hand, in the case where a conference is held in a group of members who know very well to each other, via their respective terminals, since it may be possible to expect how a handwriting input is performed by each of users, there is little inevitability to provide the access right of each of areas separately to a single person of the users. Rather, in the case where two or more members are allowed to write in the same area, discussion and information exchange can be performed more efficiently.

Then, in one embodiment of the present invention, in order to enable each of users to obtain an intended display on the display screen, users are requested separately to determine an area intended to perform a handwriting input beforehand via their respective terminals, and, it is enabled to allow only a terminal (user) having acquired a right to execute a handwriting input for the determined area. Furthermore, in order to enable discussion and information exchange to be performed efficiently in a group, for each of areas, it is enabled to choose an acquisitor of an access right of the area where a handwriting input is to be performed in the display screen, in other words, to choose whether a user oneself acquires an access right or a group to which the user belongs acquires the access right.

With this, it becomes possible to prevent beforehand the situation that two or more pieces of information are input so as to overlap each other, and that handwriting information existing on an area is shifted to another unintended location. Further, there is no need to confirm the timing and area of each of inputs performed by other terminals at every time, discussion and information exchange can be performed efficiently. Furthermore, since an access right of an area can be acquired by a group, two or more members can perform their respective handwriting inputs on the same area, whereby discussion and information exchange can be performed more efficiently.

EXAMPLES

Figure 2:
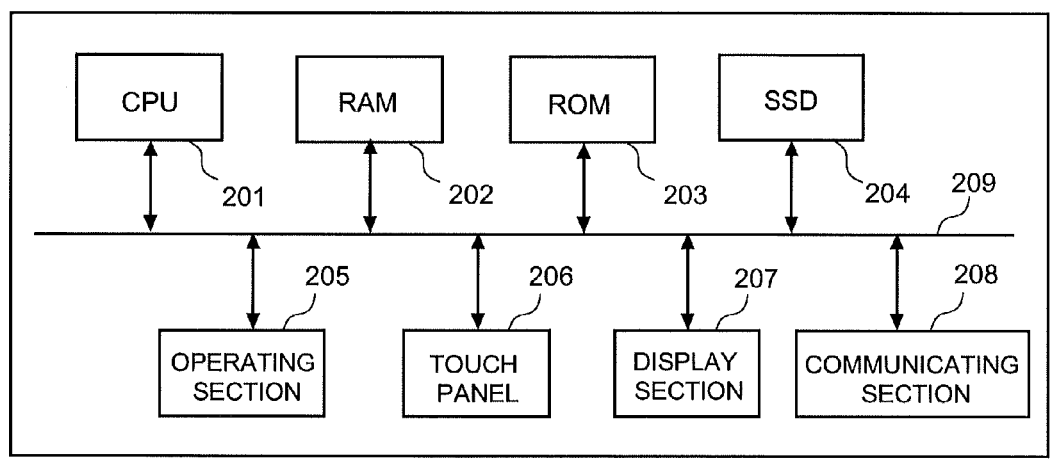
FIG. 2 is a block diagram showing a hardware constitution of an input terminal pertaining to one embodiment of the present invention.
Figure 3:
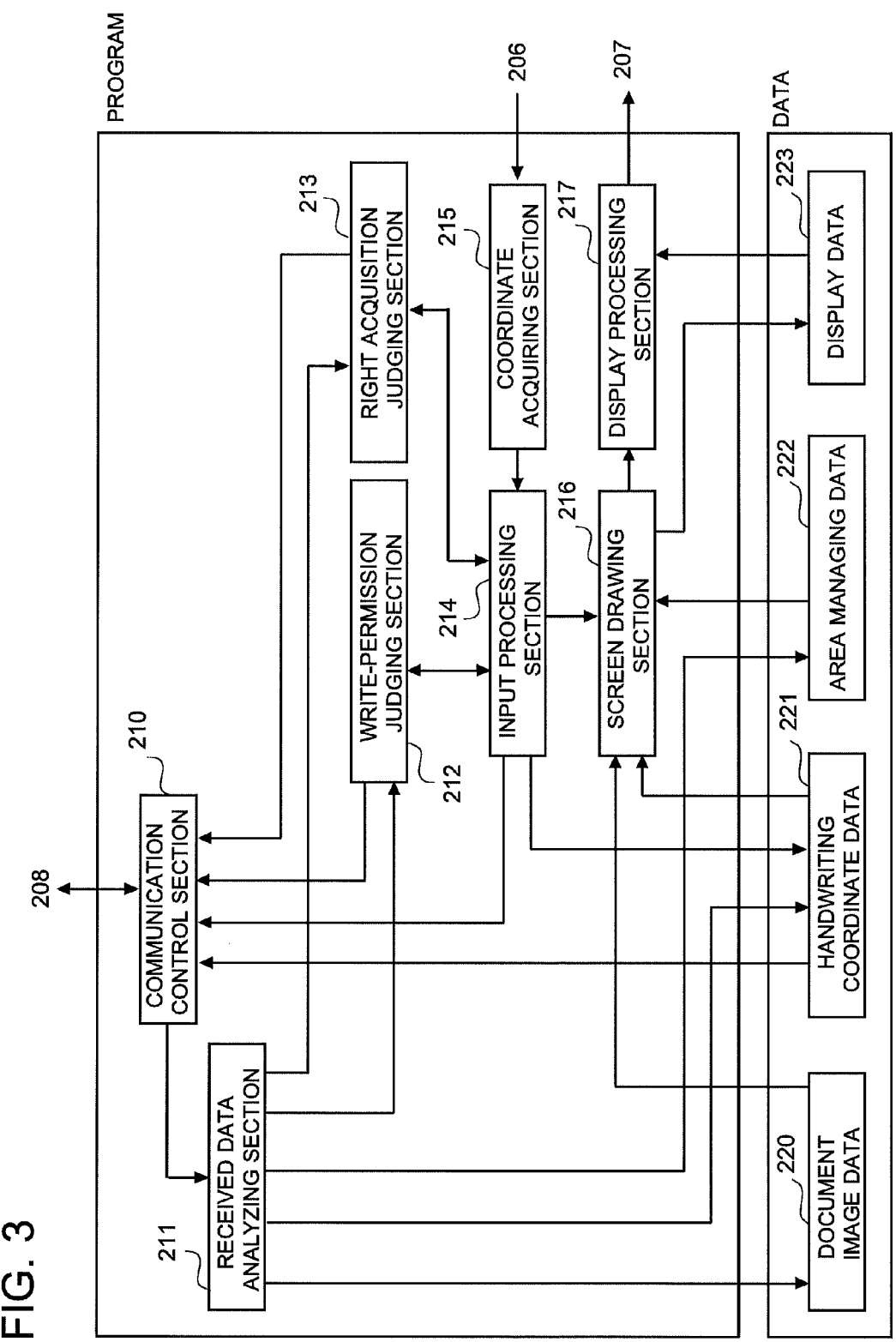
FIG. 3 is a block diagram showing a functional constitution of the input terminal pertaining to one embodiment of the present invention.
Figure 4:
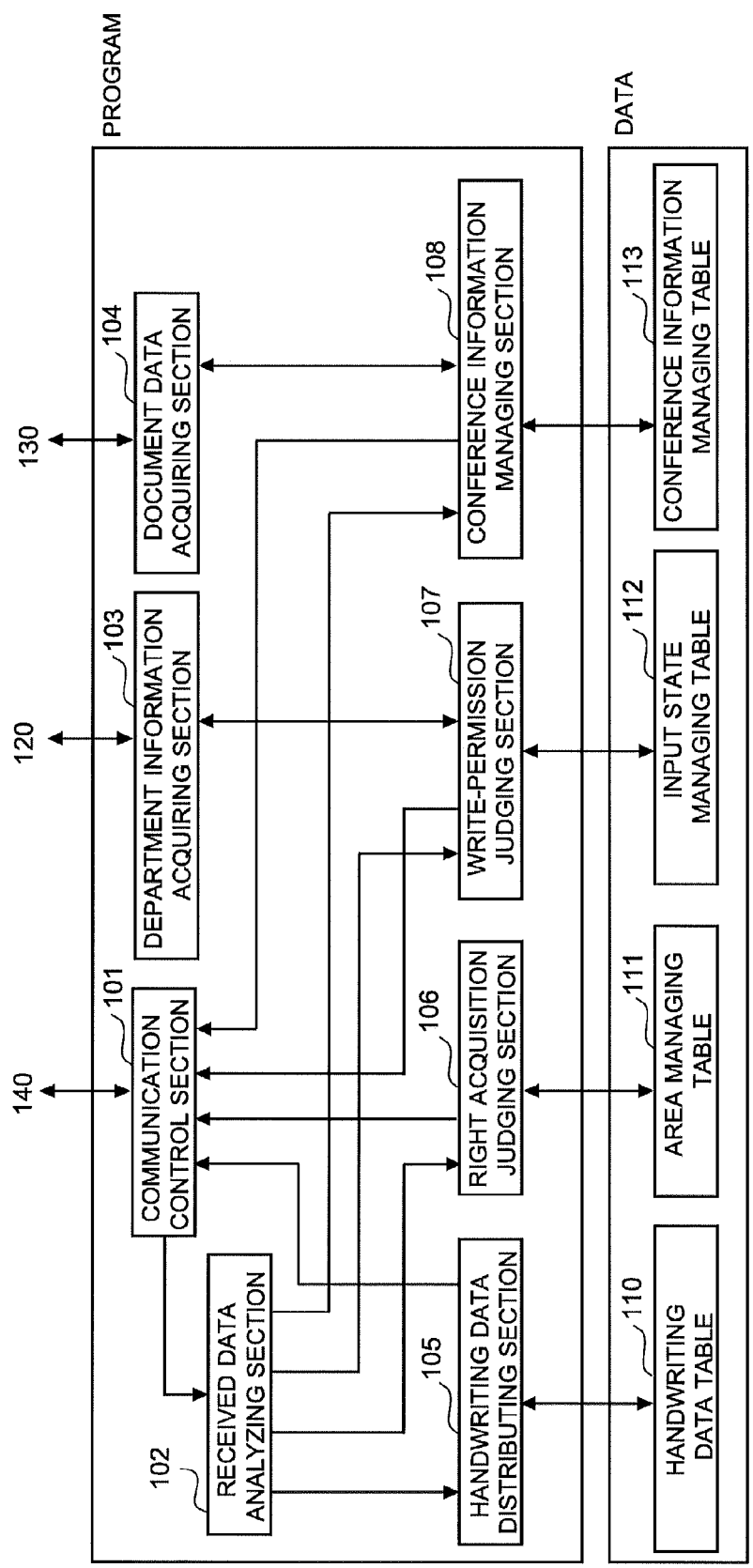
FIG. 4 is a block diagram showing a functional constitution of a conference supporting server pertaining to one embodiment of the present invention.
Figure 5:
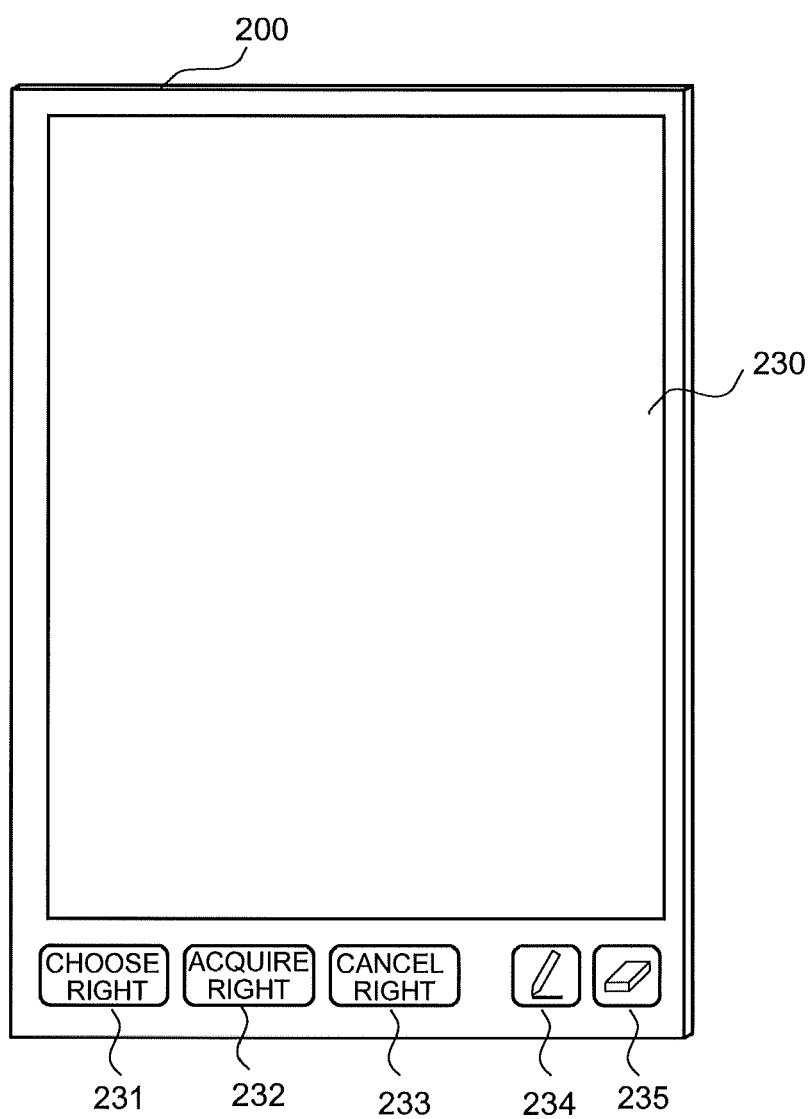
FIG. 5 is an illustration showing an outer appearance constitution of the input terminal pertaining to one embodiment of the present invention.
Figure 6:
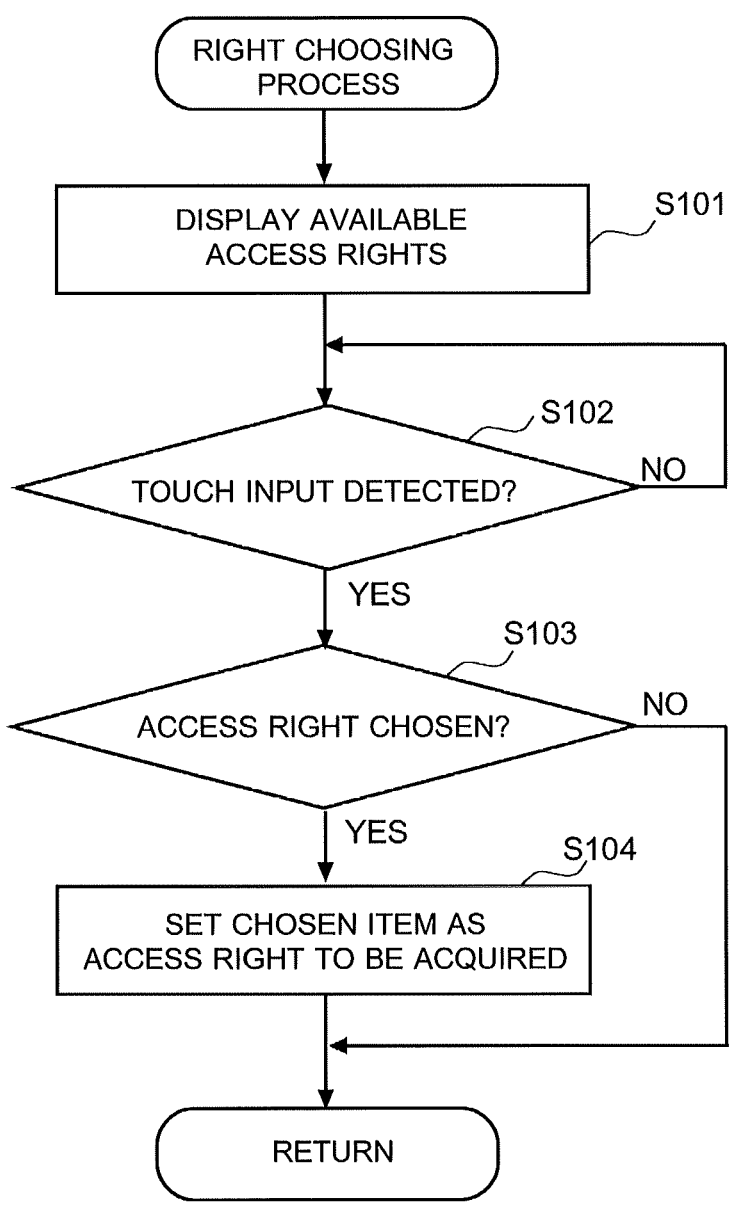
FIG. 6 is a flowchart diagram illustrating a right choosing process in the input terminal pertaining to one embodiment of the present invention.
Figure 7:
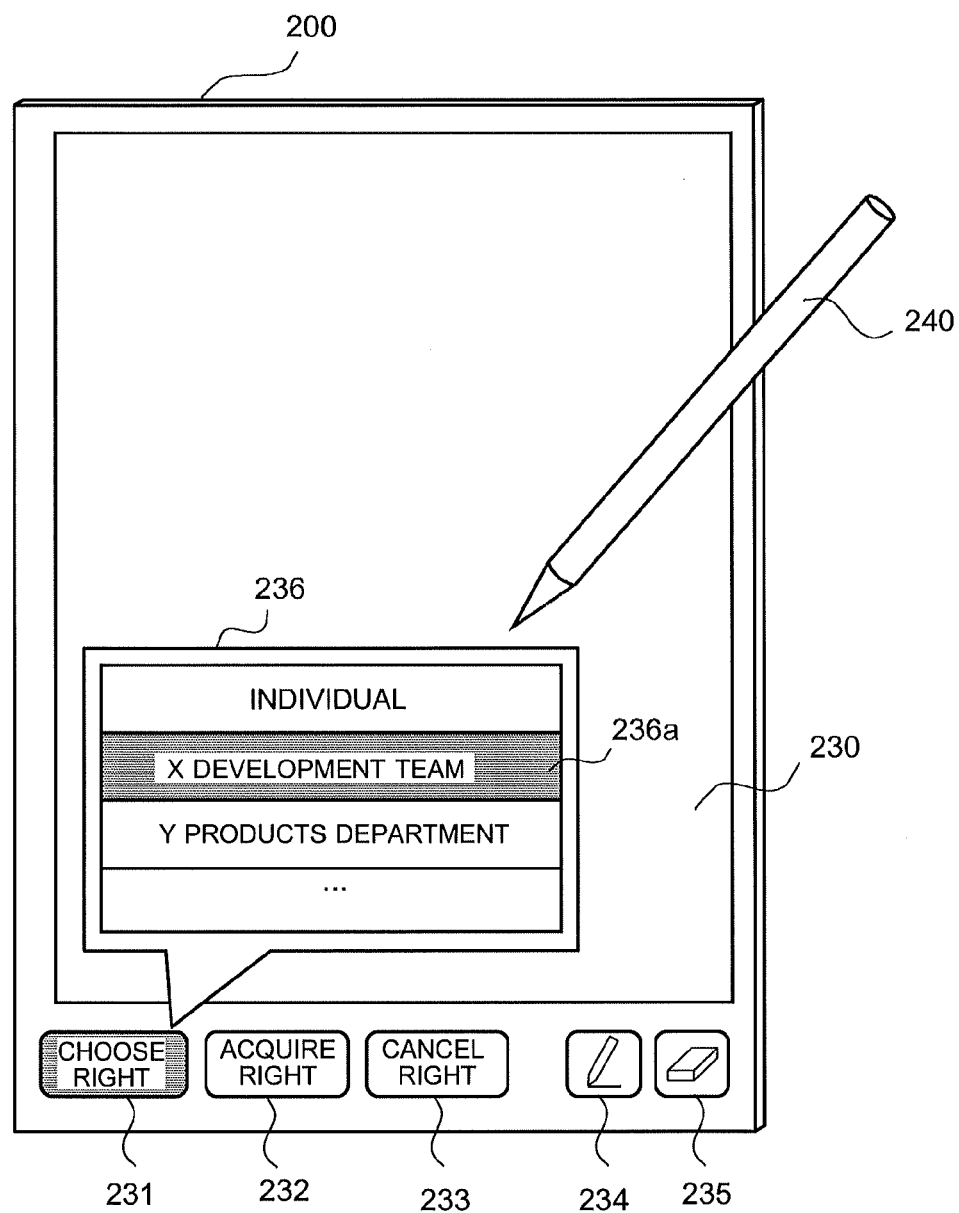
FIG. 7 is an illustration showing a right choosing operation on the input terminal pertaining to one embodiment of the present invention.

In order to describe the above-mentioned embodiment of the present invention more in detail, description will be given to a conference supporting system, control apparatus, and input terminal pertaining to one example of the present invention with reference to FIGS. 1 to 17. FIG. 1 is an illustration showing schematically a constitution of a conference supporting system of this example. FIG. 2 is a block diagram showing a hardware constitution of an input terminal of this example. FIGS. 3 and 4 are block diagrams showing respectively functional constitutions of the input terminal and the conference supporting system. Each of FIGS. 5, 7, and 9 is an illustration showing the outer appearance constitution and operation of the input terminal of this example. FIGS. 6, 8, 10, and 11 are flowchart diagrams showing the respective processes of the input terminal of this example. FIGS. 12 to 17 are flowchart diagrams illustrating the respective processes of the conference supporting server of this example.

First, the constitution of the conference supporting system of this example will be described. As shown in FIG. 1, the conference supporting system of this example includes a conference supporting server 100 configured to function as a control apparatus, an input terminal 200 (in FIG. 1, input terminals 200a to 200d) configured to input and display information, and an access point 150, and these constitutional members are connected to each other via a network 140. Further, the input terminals 200a to 200d and the access point 150 are connected to each other via a wireless LAN (Local Area Network) and the like.

To the conference supporting server 100, a department information database 120 and a document information database 130 are connected via an external interface 141 and an external interface 142 respectively so that data can be input and output between them. Further, the input terminals 200a to 200d are equipped respectively with stylus pens 240a to 240d, thereby making it possible to perform a pen input directly from a display screen.

FIG. 1 illustrates an example of the conference supporting system. Accordingly, the number of the input terminals 200 and a connection mode to the network 140 can be arbitrarily defined. Further, in this example, the conference supporting server 100 is configured to manage a plurality of input terminals 200. However, one of the input terminals 200 may be configured to function as a control apparatus and to manage the other input terminals 200.

Next, the hardware constitution of the input terminal 200 will be described. As shown in FIG. 2, the input terminal 200 includes a CPU (Central Processing Unit) 201, a RAM (Random Access Memory) 202, a ROM (Read Only Memory) 203, an SSD (Solid State Drive) 204, an operating section 205, a touch panel 206, a display section 207, a communicating section 208, and the like, and these constitutional members are connected to each other via a system bus 209.

The CPU 201 is configured to load control programs stored in the ROM 203 to the RAM 202 and to perform various kinds of processing. The RAM 202 is used to store programs as a main memory of the CPU 201. Further, the RAM 202 includes a primary memory area used as a work area to stores various data when the CPU 201 is executing control. The ROM 203 is used to store programs and data necessary for driving the input terminal 200. The SSD 204 is used to store document data and conference information which are transmitted from the conference supporting server 100, handwriting data, and the information of a user using the input terminal 200.

The operating section 205 includes buttons, keys, and the like to allow a user to perform input and various operations, and is configured to input signals corresponding to the operations and inputs of the user to the CPU 201. The touch panel 206 includes transparent electrodes arranged in the form of a matrix on the display section 207, and is configured to sense contact on the display section 207 and to input signals corresponding to the position of the contact to the CPU 21. The display section 207 is composed of a device such as a LCD (Liquid Crystal Display), and is configured to display the information designated by the CPU 201. The communicating section 208 includes a NIC (Network Interface Card) and the like, and is connected to the access point 150 via the wireless LAN and configured to enable the self input terminal 200 to perform transmission and reception of data with the other input terminals 200 and the conference supporting server 100 through the network 140.

By using the above hardware, the input terminal 200 realize the following functions. FIG. 3 shows the main functional constitution of the input terminal 200.

The input terminal 200 includes functional elements, such as a communication control section 210, a received data analyzing section 211, a write-permission judging section 212, a right acquisition judging section 213, an input processing section 214, a coordinate acquiring section 215, a screen drawing section 216 and a display processing section 217. As internal data, the input terminal 200 stores document image data 220, handwriting coordinate data 221, area managing data 222, and display data 223 in the SSD 204 or the RAM 202.

The communication control section 210 controls the communicating section 208 so as to perform transmission and reception of data with the other input terminals 200 and the conference supporting server 100 through the network 140.

The received data analyzing section 211 analyzes data received by the communication control section 210 and stores the data in a memory device, such as the SSD 204 and the RAM 202, and thereafter, transmits control signals to various functional blocks.

The coordinate acquiring section 215 converts the input signals from the touch panel 206 into coordinate data, and passes the coordinate data to the input processing section 214.

The input processing section 214 analyzes the coordinate data passed from the coordinate acquiring section 215, and performs predetermined operations. In concrete terms, when an input is a conference participation request, the input processing section 214 sends the conference participation request to the conference supporting server 100 via the communication control section 210. Further, when an input is a write-permission acquiring request, the input processing section 214 controls the screen drawing section 216 and the display processing section 217 so as to display a right choosing window on the display section 207 in order to make a user to choose whether a user expected to acquire a right is an individual person or a group. Then, in response to user's choice of an access right and determination of an area, the input processing section 214 sends a right acquiring request including the information about a right acquisition-desired area (i.e., an area for which a user desires to acquire an access right) and the information about the chosen access right to the right acquisition judging section 213. Successively, the input processing section 214 stores the information about the right-acquired area (i.e., the area whose access right has been acquired by the user or the group) and the information about the access right in the area managing data 222, and if needed, the input processing section 214 controls the screen drawing section 216 and the display processing section 217 so as to display the right-acquired area on the display section 207. Furthermore, when an input is a write permission canceling request, the input processing section 214 sends a permission canceling request including the information of a permission cancelation-required area (i.e., a area whose access right is required to be canceled) to the right acquisition judging section 213. Successively, the input processing section 214 deletes the information of the right-canceled area (i.e., the area whose access right has been canceled) from the area managing data 222, and if needed, the input processing section 214 controls the screen drawing section 216 and the display processing section 217 so as to display the right-canceled area on the display section 207. Moreover, when an input is a handwriting input operation, the input processing section 214 designates coordinates on which the handwriting input is detected, and sends a write permission request of the handwriting operation to the write-permission judging section 212. Successively, when the write permission is granted, the input processing section 214 receives the handwriting operation until an input to the touch panel 206 by a stylus pen 240 is completed, and stores the coordinate data in the inside of the terminal, and then, at the same time when the handwriting operation has been completed, the input processing section 214 sends the handwriting data to the conference supporting server 100. On the other hand, when the write permission is not granted, nothing is displayed, or the input processing section 214 controls the screen drawing section 216 and the display processing section 217 so as to display on the display section 207 the message that the handwriting operation has not been granted.

The write-permission judging section 212 receives a request from the input processing section 214, transmits the write permission request of the handwriting operation to the conference supporting server 100, and judges in response to a response from the conference supporting server 100 whether to grant the write permission or not.

The right acquisition judging section 213 receives a request from the input processing section 214, transmits the right acquiring request to the conference supporting server 100, and judges in response to a response from the conference supporting server 100 whether the right acquisition is succeeded or failed.

The screen drawing section 216 produces images to be displayed on the display section 207 based on the information, such as document image data 220, handwriting coordinate data 221 and area managing data 222, and stores the images as display data 223.

The display processing section 217 reads the display data 223, and performs the display processing for the display section 207.

On the other hand, the conference supporting server 100 realizes the following functions. FIG. 4 shows the main functional constitution of the conference supporting server 100.

The conference supporting server 100 includes functional elements, such as a communication control section 101, a received data analyzing section 102, a department information acquiring section 103, a document data acquiring section 104, a handwriting data distributing section 105, a right acquisition judging section 106, a write-permission judging section 107 and a conference information managing section 108. Further, the conference supporting server 100 holds data such as a handwriting data table 110, an area managing table 111, an input state managing table 112, and a conference information managing table 113 in its inside, and processes them.

The communication control section 101 performs transmission and reception of data with the input terminals 200 through the network 140.

The received data analyzing section 102 analyzes the data which are transmitted from the input terminal 200 and received by the communication control section 101, and passes the analyzed data to each of the functional blocks in accordance with the data format.

The handwriting data distributing section 105 stores the handwriting data transmitted from the input terminal 200 in the handwriting data table 110, and thereafter, the handwriting data distributing section 105 distributes the handwriting data to all the input terminals 200 which are participating in the conference.

The right acquisition judging section 106 receives a right acquiring request transmitted from the input terminal 200, i.e., the information about a right acquisition-desired area and the information about the access right, and judges whether or not to grant the access right based on the information of areas on a document screen managed by the area managing table 111 and information about access rights acquired on the areas. In concrete terms, upon reference of the information of the acquired access rights, under the condition that the access right has been already acquired on a part of the determined area, the right acquisition judging section 106 grant the access right only for a part for which the access right has not been acquired, and updates the information in the area managing table 111. Thereafter, the right acquisition judging section 106 notifies the area whose access right has been acquired in this process to the input terminals 200. Further, with regard to a part or the whole of the determined area on which the right has been already acquired by another, the information about the no right-acquired area (i.e., the information of the area whose access right has not been acquired) and the information about the access right are registered into a right grant waiting queue in the area managing table 111.

The write-permission judging section 107 receives a write permission request of the handwriting operation transmitted from the input terminal 200, and judges whether or not to grant write permission based on whether the area expected to be subjected to the write operation is the right-acquired area.

The conference information managing section 108 receives a conference participation request transmitted from the input terminal 200, and transmits document data and the like for participating in the conference to the input terminals 200.

The department information acquiring section 103 receives the user information of the transmission source of the write permission request from the write-in permission judging section 107, performs an inquiry for the department information database 120, and acquires the information of the department (group) to which the user belongs.

The document data acquiring section 104 receives a request from the conference information managing section 108, downloads the document data relevant to the conference from the document information database 130, and passes the document data to the conference information managing section 108.

Next, the actions of the input terminal 200 will be described. FIG. 5 shows an example of the outer appearance constitution of the input terminal 200. The screen of the input terminal 200 includes a document display window 230, a right choosing button 231, a right acquiring button 232, a right canceling button 233, a pen button 234 and an eraser button 235.

The document display window 230 is configured to display the document data stored in the inside of the terminal, to display handwriting data by superimposing them on a document and to display the information such as an area whose write permission has been acquired, and messages. Further, when a touch input by the stylus pen 240 is detected within the document display window 230, a handwriting input process is executed.

When a touch input by the stylus pen 240 is detected on the right choosing button 231, the right choosing process to choose an access right to be acquired is executed. When a touch input by the stylus pen 240 is detected on the right acquiring button 232, a right acquiring process is executed. When a touch input by the stylus pen 240 is detected on the right canceling button 233, a right canceling process is executed.

When a touch input by the stylus pen 240 is detected on the pen button 234, the input terminal 200 shifts to a pen mode, and it becomes possible to add characters, figures, and the like by a handwriting input. When a touch input by the stylus pen 240 is detected on the eraser button 235, the input terminal 200 shifts to an eraser mode, and it becomes possible to delete characters, figures, and the like by a handwriting input.

In FIG. 5, the input terminal 200 is configured to make it possible to perform a touch input on the entire surface of the input terminal 200. However, each of the right choosing button 231, the right acquiring button 232, the right canceling button 233, the pen button 234, and the eraser button 235 may be constituted by a physical buttons.

Hereafter, the actions of the conference supporting system of this example will be described. First, each of the processes executed in the input terminal 200 will be described.

Right Choosing Process:

First, the right choosing process of the input terminal 200 will be described with reference to the flowchart diagram shown in FIG. 6 and an example of a screen shown in FIG. 7.

The input terminal 200 displays available access rights in a list based on the information of a user using the terminal (S101). For example, when a user touches the right choosing button 231 with the stylus pen 240, the input processing section 214 controls the screen drawing section 216 and the display processing section 217 to operate the display section 207 to display a right choosing window 236 shown in FIG. 7. In this right choosing window 236, the list 236a including items of available access rights (the user oneself who is using the terminal, and one group or two or more groups to which the user belongs) is displayed. When a touch input in the right choosing window 236 is detected (YES in S102), the input processing section 214 judges which one of the access rights in the right choosing window 236 is chosen (S103). When one of the access rights is chosen, the selected access right is set as an access right to be acquired (S104), and when a location other than the right choosing window 236 is touched, the flow returns to the screen state shown in FIG. 5 without doing anything.

Right Acquiring Process:

Next, the right acquiring process of the input terminal 200 will be described with reference to the flowchart diagram shown in FIG. 8 and an example of a screen shown in FIG. 9.

A user touches the right acquiring button 232 with the stylus pen 240, and determines an area where the user desires to acquire the access right of the area within the document display window 230 (S201). As a method for determining an area, the following method may be considered. For example, the stylus pen 240 is made to designate an upper left point on an area by touching the upper left point, and the stylus pen 240 is dragged to a lower right point on the area while keeping the touching. Successively, when the stylus pen 240 is separated away from the touched point on the area, the determined area is fixed. After the user determines the area, the input processing section 214 notifies the information of the area determined by the user (coordinates of the area) and the information of the access right chosen by the right choosing process shown in FIG. 6 (the information of the user using the input terminal 200 and the kind of an individual person/a group) to the right acquisition judging section 213. In turn, the right acquisition judging section 213 transmits these pieces of the information as a right acquiring request to the conference supporting server 100 (S202).

Then, upon receipt of a response to this right acquiring request from the conference supporting server 100, the right acquisition judging section 213 judges based on the response whether the determined area overlaps with another area (S203). When the determined area overlaps with another area, the input processing section 214 controls the screen drawing section 216 and the display processing section 217 to display on the document display window 230 the message that the information about the area has been registered in the right grant waiting queue in the conference supporting server 100 because a part or the whole of the area overlaps with another area (S204).

Next, the input processing section 214 receives the information of the right-acquired area from the right acquisition judging section 213, and controls the screen drawing section 216 and the display processing section 217 so as to display the right-acquired area on the document display window 230 (S205). FIG. 9 shows the state that the areas are displayed on the document display window 230. For example, a personal right area 237a and personal right area 237b which are acquired by two different users via their respective input terminals 200, and a group right area 238 acquired by a group to which the two users belong, are displayed. In concrete terms, in the above example, the personal right area 237a is an area whose access right is acquired by a user using this terminal 200, and the personal right area 237b is an area whose access right is acquired by another user of a group to which the above user belongs. The group right area 238 is an area whose access right is acquired by a group to which the two users belong. The respective access rights of the above areas are acquired in the order of the personal right area 237a, the personal right area 237b, and the group right area 238. On the screen, each area is provided with a texture (pattern) corresponding to the kind of the corresponding access right. Further, the group right area 238 is determined so as to overlap partially with the personal right area 237a and the personal right area 237b, and the access right of the group right area 238 is granted only for an area which does not overlap with the other personal right areas. In the screen shown in FIG. 9, the personal right area and the granted group right area adjoin. Under the condition that the user of the personal right area belongs to the group of the group right area, the user is allowed to perform a handwriting input continuously over a range of the two areas. Furthermore, by providing the texture corresponding to the kind of each access right, the kind of an access right can be visualized, thereby assisting the operation of the user.

Here, FIG. 9 shows merely an example of an area display, and the shape, size, and display mode of each of the areas should not be limited to the constitution shown in this drawing. For example, although the shape of the area is generally a rectangle, the shape may be made to a shape outlined with an outer frame formed by a locus drawn with the stylus pen 240 by a user or to shapes such as an ellipse. Further, with regard to the size, if the personal right area of each user becomes large, it becomes difficult for other users to perform a handwriting input. Accordingly, the size of an area may be limited such that an area whose access right can be acquired by a group becomes larger than an area whose access right can be acquired by each user.

Furthermore, in FIG. 9, access rights are granted such that the group right area whose access right is acquired later does not overlap with the personal right areas. Alternatively, in the case where a group right area overlaps with a personal right area of a user who belongs to the group of the group right area, a right on the overlapped part of the area may be transferred to the group so that the group is given priority over the user with regard to the overlapped area. Moreover, although not shown in FIG. 9, it may be considered a situation that a personal right area and a group right area are located close to each other, but not adjoin each other. In such a situation, in the case where the size of one of them becomes short due to handwriting inputs, it may be permissible to add a process to enlarge one of them so as to adjoin the other one.

Figure 8:
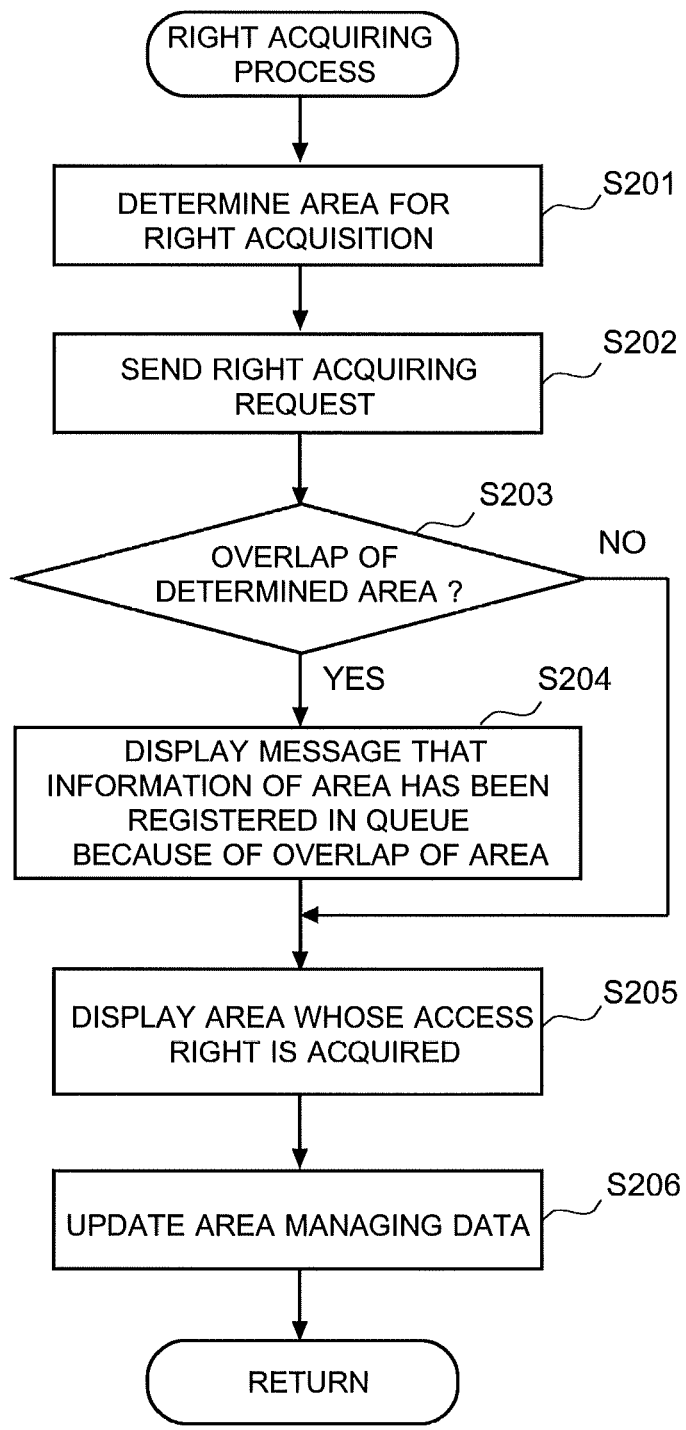
FIG. 8 is a flowchart diagram illustrating a right acquiring process in the input terminal pertaining to one embodiment of the present invention.
Figure 9:
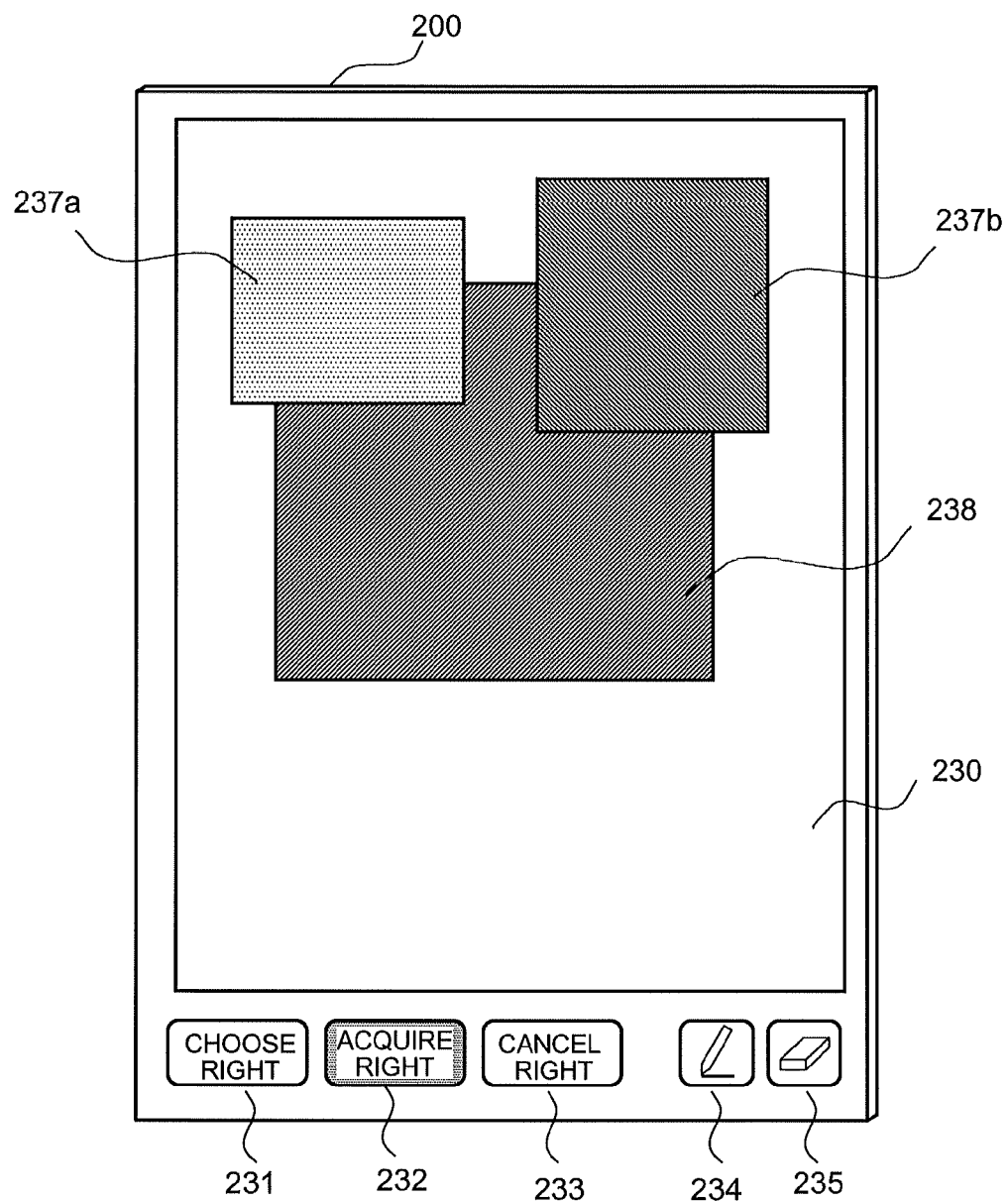
FIG. 9 is an illustration showing an area designating operation on the input terminal pertaining to one embodiment of the present invention.

Now, returning to the flowchart diagram shown in FIG. 8, finally, the input processing section 214 updates the area managing data 222 by using the information about the newly-acquired access right and the information of the newly-acquired area (S206).

Figure 10:
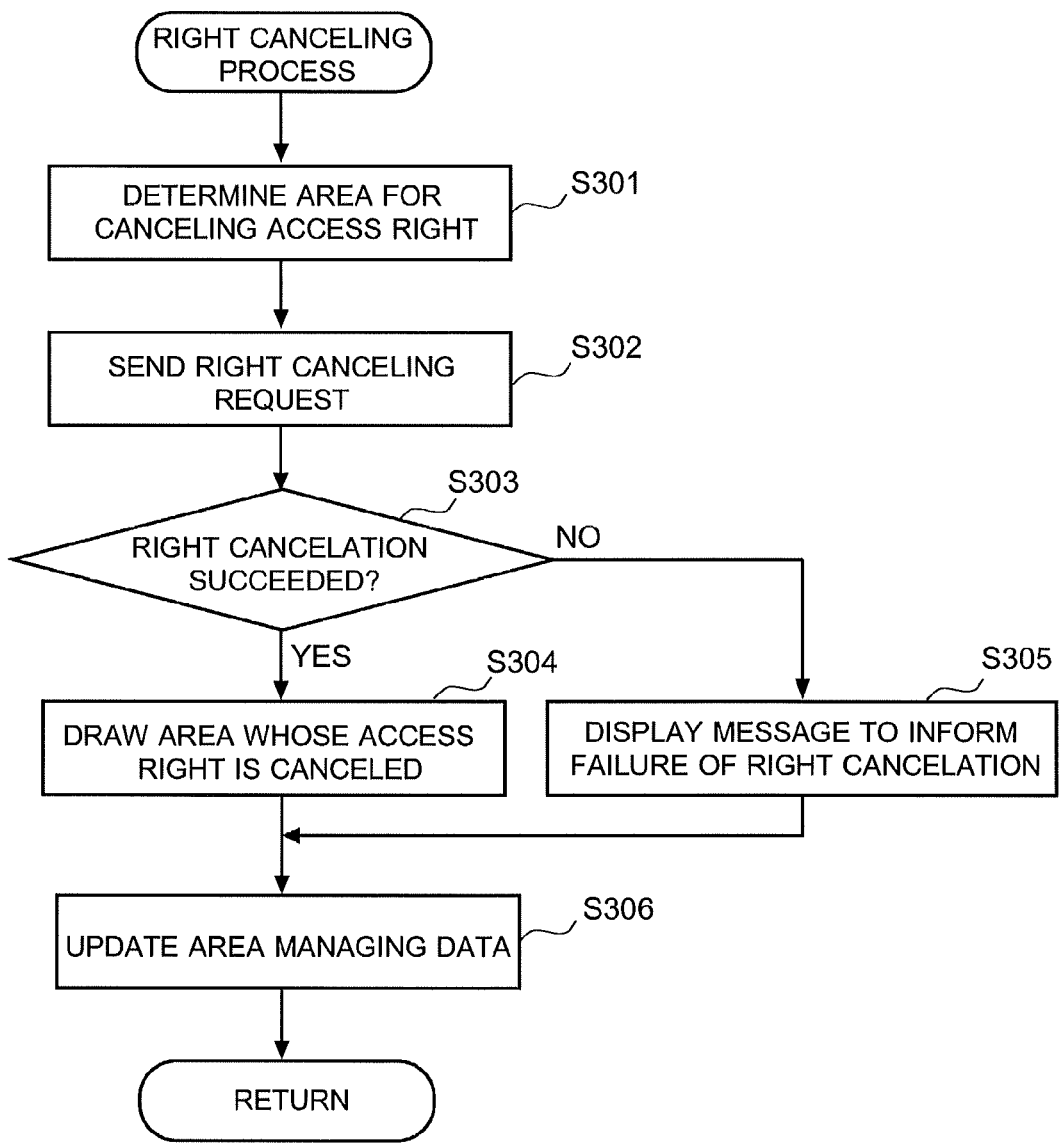
FIG. 10 is a flowchart diagram illustrating a right canceling process in the input terminal pertaining to one embodiment of the present invention.

Right Canceling Process:

Next, the right canceling process of the input terminal 200 will be described with reference to the flowchart diagram shown in FIG. 10.

A user touches the right canceling button 233 with the stylus pen 240 and determines an area where the user desires to cancel the access right, within the document display window 230 (S301). As a method for determine an area, similar to the above, the stylus pen 240 is made to designate an upper left point on an area by touching the upper left point, and the stylus pen 240 is dragged to a lower right point on the area while keeping the touching. Then, when the stylus pen 240 is separated away from the touched point on the area, the determined area is fixed. When the user determine the area, the input processing section 214 notifies the information of the area determined by the user to the right acquisition judging section 213, and the right acquisition judging section 213 transmits the information as a right canceling request to the conference supporting server 100 (S302).

Successively, upon receipt of a response to the right canceling request from the conference supporting server 100, the right acquisition judging section 213 judges based on the response whether the right cancelation for the determined area is succeeded (S303). If the canceling process has been succeeded even for at least a part of the determined area, the input processing section 214 controls the screen drawing section 216 and the display processing section 217 so as to draw an area whose access right has been canceled (updates the indication of the right-acquired area shown in FIG. 9) (S304). When the canceling process has not been performed on all over the determined area, the input processing section 214 controls the display section 207 to display the message that the canceling process has not been performed for the whole of the area (S305). Finally, the input processing section 214 updates the area managing data 222 by using the information of the access right changed by the canceling process and the information of the area changed by the canceling process (S306).

Figure 11:
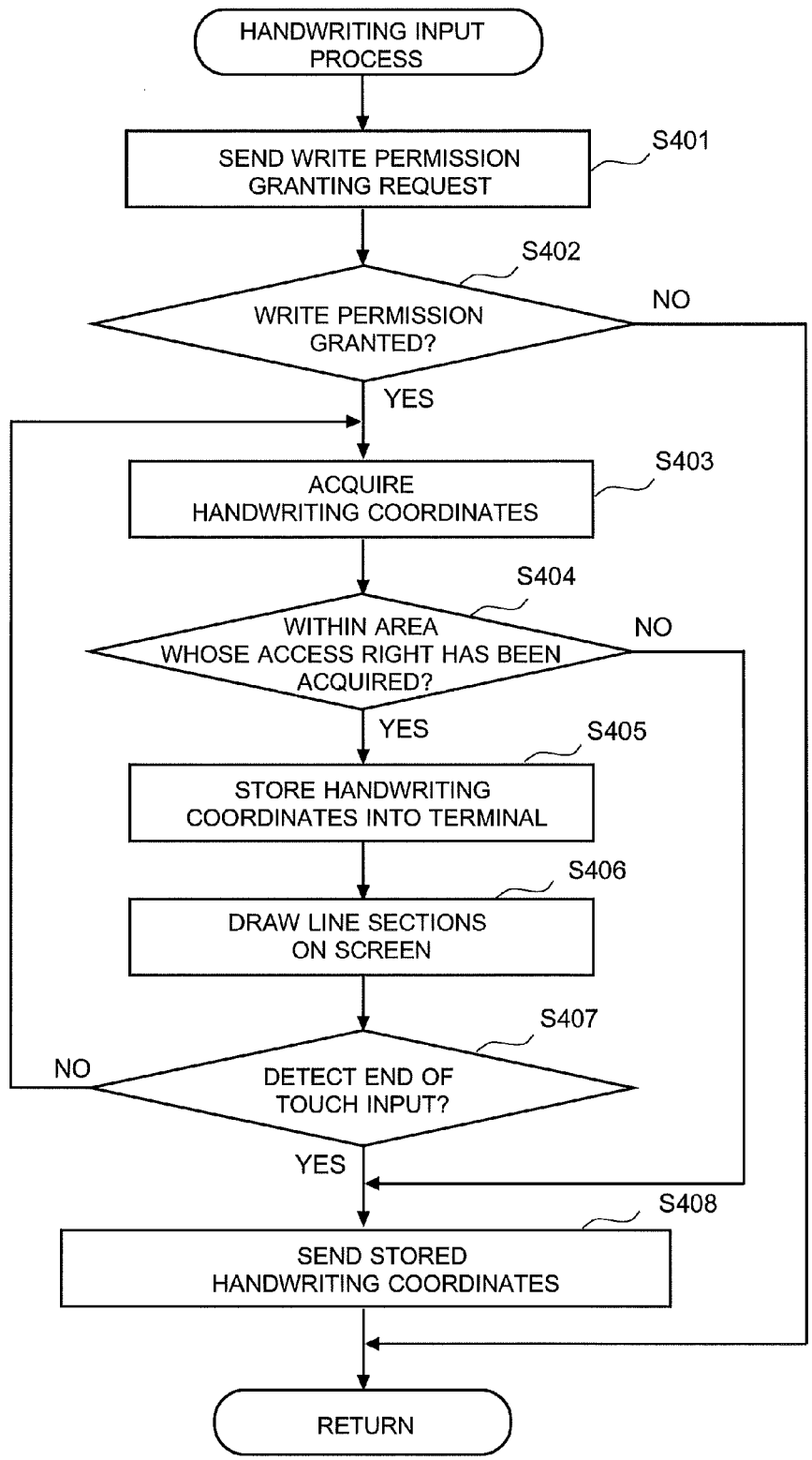
FIG. 11 is a flowchart diagram illustrating a handwriting input process in the input terminal pertaining to one embodiment of the present invention.

Handwriting Input Process:

Next, the handwriting input process of the input terminal 200 will be described with reference to a flowchart diagram shown in FIG. 11.

When the input processing section 214 detects a handwriting input operation to the document display window 230, the write-permission judging section 212 designates coordinates on which the handwriting input operation is detected, and sends a write permission granting request for the handwriting input to the conference supporting server 100 (S401). Successively, upon receipt of a response from the conference supporting server 100, the write-permission judging section 212 judges whether the write permission request has been granted or not (S402). When the write permission request has not been granted, the handwriting input process is ended as it is. On the other hand, when the write permission request has been granted, the input processing section 214 controls the coordinate acquiring section 215 so as to acquire coordinate information inputted from the touch panel (S403). Further, the input processing section 214 judges whether the handwriting input can be accommodated in a write right-acquired area (an area whose access right has been acquired by the user of this input terminal 200 and an area whose access right has been acquired by a group to which the user belongs), in other words, judges whether the acquired coordinates fall in areas whose access right has been acquired by the user or the group (S404).

When the handwriting input by the stylus pen 240 has overflowed into another area whose write permission has not been acquired, the handwriting operation is ended at this time. On the other hand, when the handwriting input by the stylus pen 240 is accommodate in the write right-acquired area (including the case where the handwriting input is performed over a range of both an area whose access right is acquired by the user of this input terminal 200 and an area whose access right is acquired by a group to which the user belongs), the input processing section 214 stores the acquired coordinates temporarily in the terminal (S405), and the screen drawing section 216 draws a line section by connecting between coordinates on the screen (S406).

At this time, when the stylus pen 240 of the user is separated away from the display section 207 and the completion of the touch input is detected (YES in S407), the handwriting operation is ended. Alternatively, when the handwriting input is performed continuously, the flow is executed again from the operation at 5403. Subsequently, after the handwriting input operation has been completed, the input processing section 214 transmits the handwriting data stored in the terminal to the conference supporting server 100 (S408), whereby the input processing section 214 enables the other input terminals 200 to display also the handwriting data by reflecting the handwritten information input by itself.

Next, the actions of the conference supporting server 100 of this example will be described.

Figure 12:
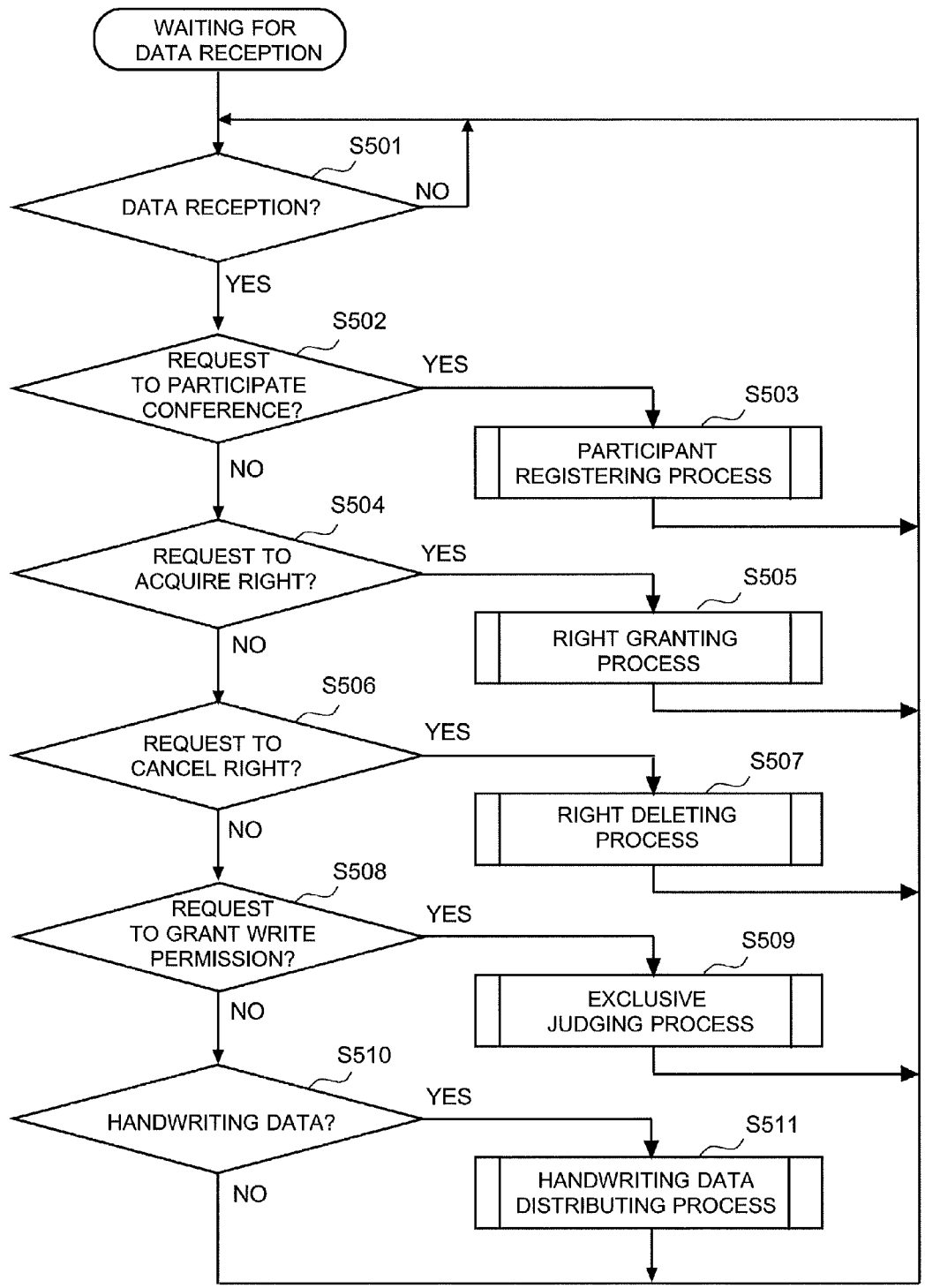
FIG. 12 is a flowchart diagram illustrating an overall process in the conference supporting server pertaining to one embodiment of the present invention.

Data Receiving Process:

First, the data receiving process of the conference supporting server 100 of this embodiment will be described with reference to the flowchart diagram shown in FIG. 12.

The communication control section 101 of the conference supporting server 100 waits for the reception of data transmitted from the input terminal 200 (S501), and upon detection of data reception, the received data analyzing section 102 analyzes the received data and makes the process flow to each of various processing blocks.

In concrete terms, when a conference participation request is received (S502), the conference information managing section 108 performs a participant registering process (S503). When a right acquiring request is received (S504), the right acquisition judging section 106 performs a right granting process (S505). When a right canceling request is received (S506), the right acquisition judging section 106 performs a right deleting process (S507). When a write permission request is received (S508), the write permission judging section 107 performs an exclusive judging process (S509). When handwriting data are received (S510), the handwriting data distributing section 105 performs a handwriting data distributing process (S511).

Figure 13:
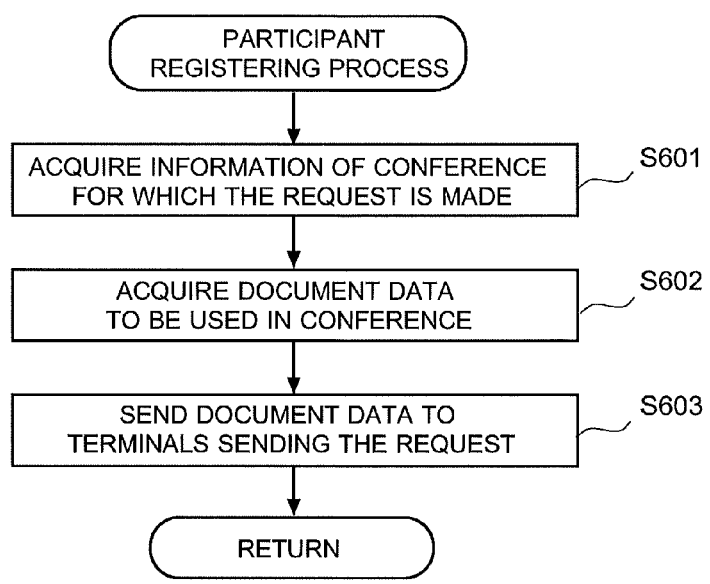
FIG. 13 is a flowchart diagram illustrating a participant registering process in the conference supporting server pertaining to one embodiment of the present invention.

Participant Registering Process:

The detail of the participant registering process at 5503 is described with reference to the flowchart diagram shown in FIG. 13.

Upon receipt of a conference participation request from the input terminal 200, the conference information managing section 108 read the information of the conference into which the participation is requested, from the conference information managing table 113 (S601), and acquires document data used in the conference from the document information database 130 (S602). Subsequently, the conference information managing section 108 transmits the acquired document data to each of the input terminals 200 sending the participation request (S603).

Figure 14:
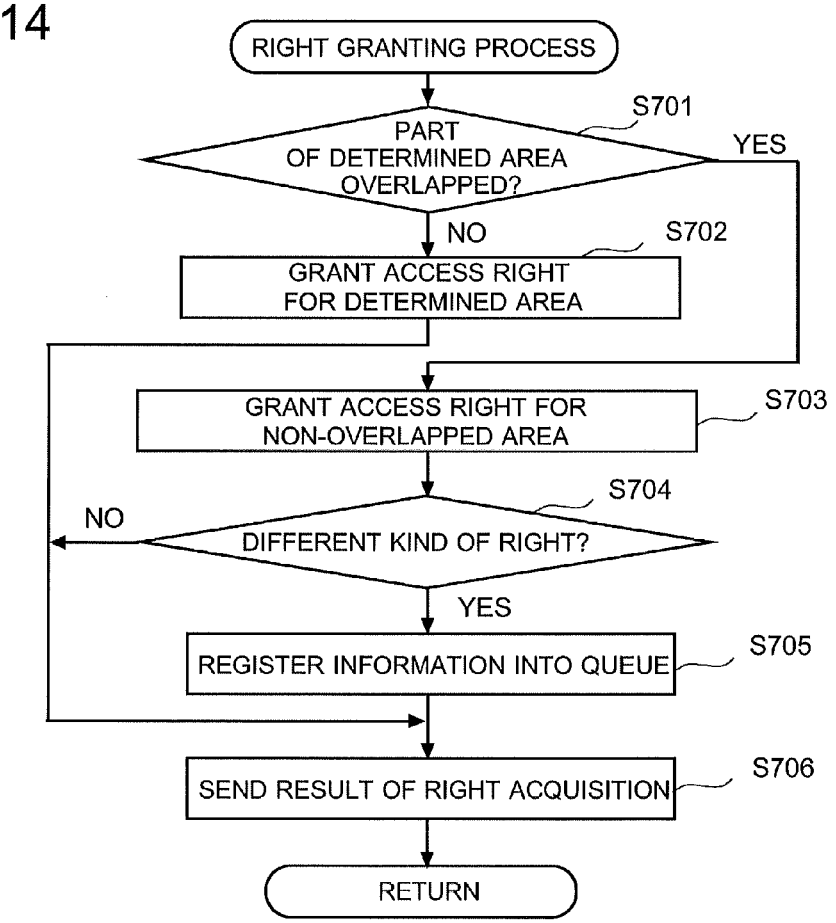
FIG. 14 is a flowchart diagram illustrating a right granting process in the conference supporting server pertaining to one embodiment of the present invention.

Right Granting Process:

Next, the detail of the right granting process at 5505 is described with reference to a flowchart diagram shown in FIG. 14.

Upon receipt of a right acquiring request from the input terminal 200, the right acquisition judging section 106 refers the area managing table 111, and judges whether an access right has already been acquired in the determined area (S701). When there is no access right having been acquired in the determined area, an access right is granted to all over the determined area (S702). On the other hand, when there is a part of the determined area whose access right has been acquired by another, an access right is granted only for a part of the determined area which does not overlap with the other area (S703). At this time, in the case where an area where a group intends to acquire an access right overlaps with an area where a member of the group has already acquired an access right, if an access right is granted to the group, the member also can perform writing in the area. Accordingly, priority may be given to the group so that the access right granted to the member may be canceled and the access right may be granted to the group.

Further, the access right requested to be acquired is compared with the right granted to the overlapped area (S704). As a result of the comparison, in the case where the kinds of the access right (the users having the access rights) are different, the information of the overlapped area and the information of the requested access right are registered in the right grant waiting queue (S705).

Subsequently, the information about the granted access right and the information about the granted area are transmitted to the input terminal 200 of the transmission source of the right acquiring request as a right acquisition result (S706). Here, when the access right is granted to the group, the right acquisition result may be transmitted not only to the input terminal 200 of the transmission source of the right acquiring request, but also to the respective input terminals 200 of the other members belonging to the group. By displaying the right-acquired area on the respective input terminals 200 of the other members, the other members also notice that a handwriting input can be performed for the area, whereby discussion and information exchange can be performed efficiently.

Figure 15:
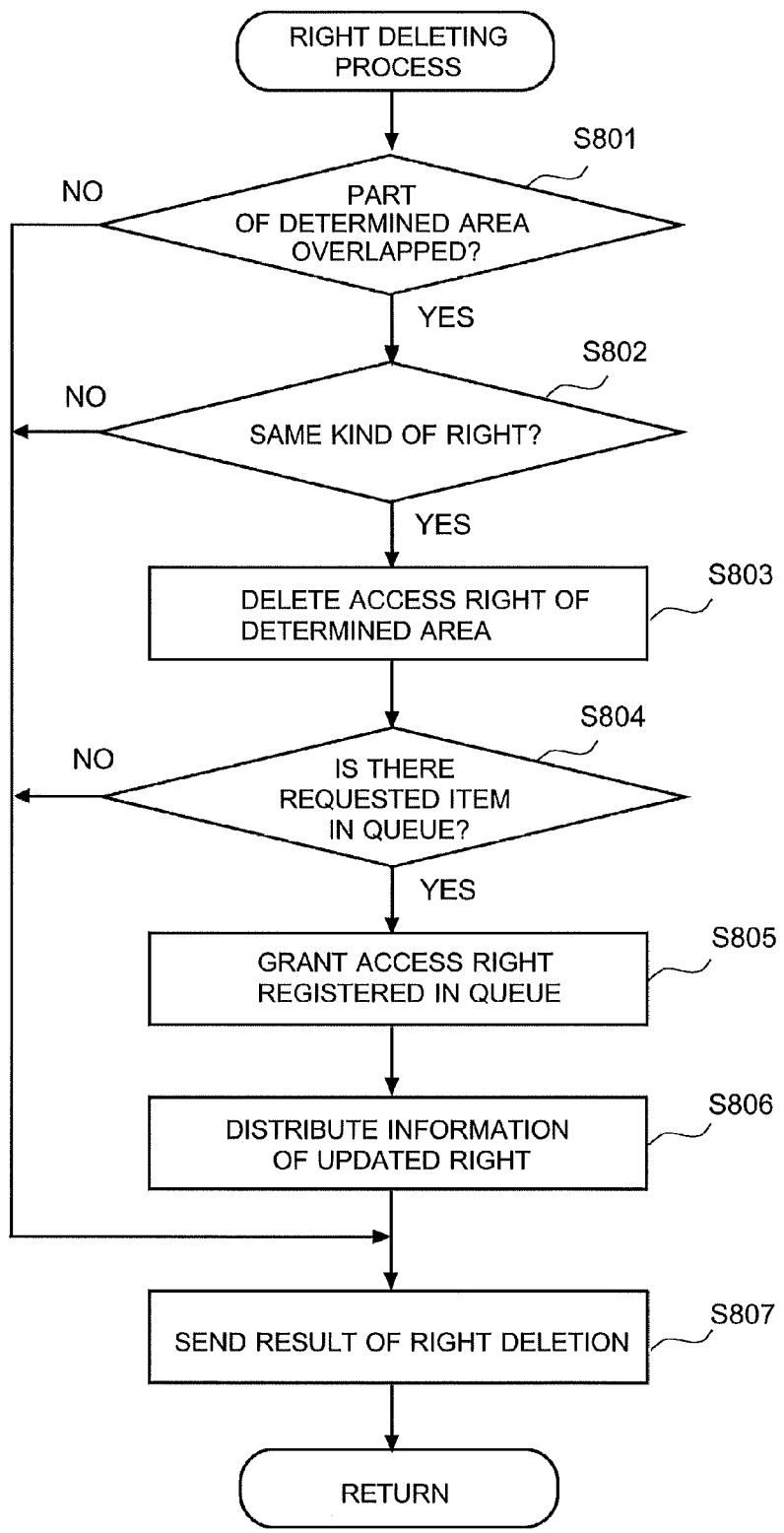
FIG. 15 is a flowchart diagram illustrating a right deleting process in the conference supporting server pertaining to one embodiment of the present invention.

Right Deleting Process:

Next, the detail of the right deleting process at S507 is described with reference to the flowchart diagram shown in FIG. 15.

Upon receipt of a right deleting request from the input terminal 200, the right acquisition judging section 106 refers the area managing table 111, and judges whether there is an access right granted for the determined area (S801). If there is a part provided with an access right in the determined area, the right acquisition judging section 106 judges whether the access right on the area is the same as the access right required to be canceled (S802). When there exists the same access right as the access right required to be canceled, the right acquisition judging section 106 deletes the access right in the determined area, and updates the area managing table 111 (S803). Next, the right acquisition judging section 106 judges whether, in the area where the access right has been deleted, a access right requested to be acquired is registered in the right grant waiting queue (S804). As a result of the judgment, if an access right is registered, the right acquisition judging section 106 takes out the information from the right grant waiting queue, and grants the registered right (S805), and further distributes the information of the updated access rights and areas to each of the input terminals 200 (S806). Finally, the right acquisition judging section 106 transmits a right cancelation result to the input terminal 200 of the request transmitting source (S807).

Figure 16:
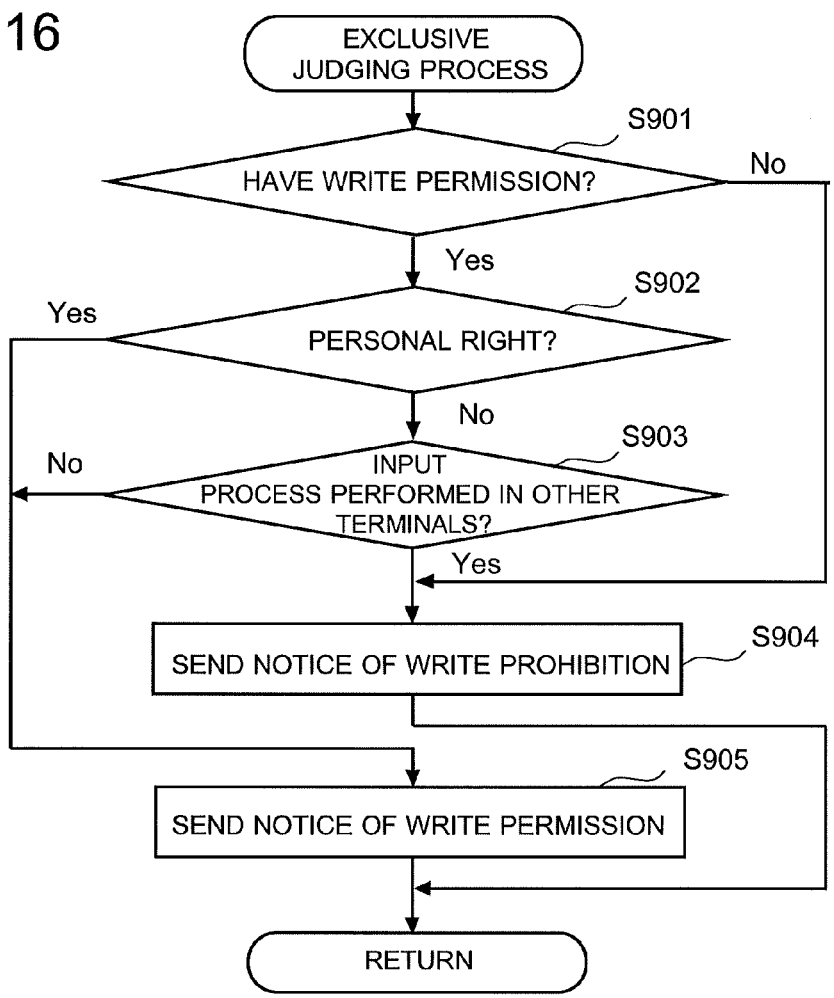
FIG. 16 is a flowchart diagram illustrating an exclusive judging process in the conference supporting server pertaining to one embodiment of the present invention.

Exclusive Judging Process:

Next, the detail of the exclusive judging process at S509 is described with reference to the flowchart diagram shown in FIG. 16.

Upon receipt of a write permission request from the input terminal 200, the write-permission judging section 107 refers the area managing table 111, and judges whether write permission has been granted to the input terminal 200 of the requesting source for the requested coordinates (S901). When the write permission is not granted, the write-permission judging section 107 transmits a notice of write prohibition to the input terminal 200 of the requesting source and invalidates the handwriting input. When the write permission is granted, the write-permission judging section 107 judges whether the right is a personal right (S902). If the right is a personal right, since a user capable of inputting is a single person, the write-permission judging section 107 transmits instantly a notice of write permission to the input terminal 200 of the requesting source (S905).

On the other hand, if the right is not a personal right (in the case of a group right), the write permission judging section 107 refers the input state managing table 112, and judges whether there exists the input terminal 200 of other member of the group, on which a handwriting input is currently performed (S903). When the other input terminal 200 is currently performing a handwriting input, since it is not desirable that two or more input terminals 200 perform simultaneously writing, the write-permission judging section 107 transmits a notice of write prohibition to the input terminal 200 of the requesting source (S904). On the other hand, when the other input terminal 200 is not currently performing a handwriting input, the write-permission judging section 107 transmits a notice of write permission to the input terminal 200 of the requesting source (S905).

Figure 17:
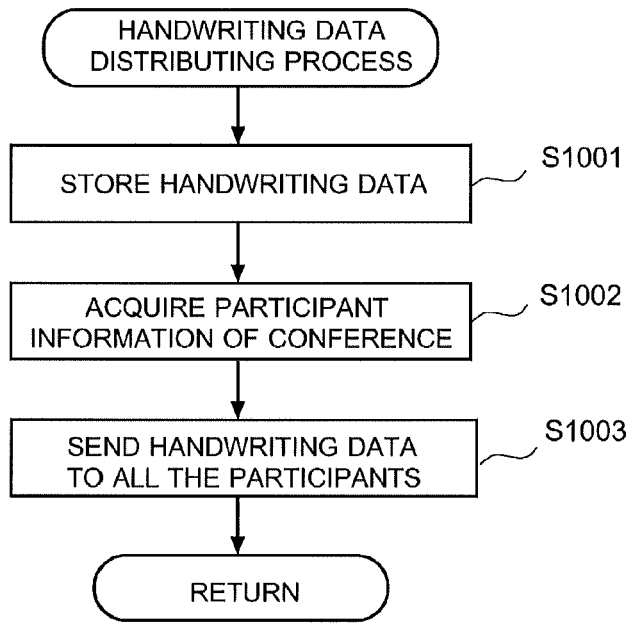
FIG. 17 is a flowchart diagram illustrating a handwritten data distributing process in the conference supporting server pertaining to one embodiment of the present invention.

Handwriting Data Distributing Process:

Next, the detail of the handwriting data distributing process at S511 is described with reference to the flowchart diagram shown in FIG. 17.

Upon receipt of handwriting data, the handwriting data distributing section 105 adds the handwriting data to the handwriting data table 110 (S1001). Next, the handwriting data distributing section 105 refers the conference information managing table 113 of the conference, and acquires the information of the terminal of each of the users who are participating in the conference (S1002). Subsequently, based on the acquired information of the terminal, the handwriting data distributing section 105 distributes the received handwriting data to each of the input terminals 200 being participating in the conference (S1003).

As described above, a user can acquire an access right of a desired area by operating an input terminal 200, and in an area whose access right has already been acquired, only a user provided with the access right can perform an input. Accordingly, since the overlapping among two or more pieces of handwriting information can be prevented beforehand, a user can attain a display screen as intended.

Further, for a single area, it is possible to choose whether only oneself acquires an access right or two or more users acquire the access right at one time. Accordingly, areas provided with respective different rights can be used separately in accordance with situations, whereby it becomes possible to improve the convenience of users. For example, by using the relationship between individual persons, the relationship between managerial positions, and the relevant information between groups, it is possible to permit a specific user or group to perform writing in an area whose access right is not acquired by oneself. Further, it is also possible to permit superiors to perform writing in an area on which a subordinate acquires a personal right (not to permit subordinates to perform writing in an area on which a superior acquires a personal right). Furthermore, it is also possible to permit users of a parent company to perform writing in an area on which a subsidiary company acquires a right (not to permit users of a subsidiary company to perform write-in on a area a parent company acquires a right).

Moreover, a user can request at an arbitrary timing for the conference supporting server 100 to cancel a write permission of a designated area, and successively, if the determined area overlaps with another area and the determined access right is not the same as that of another area, the conference supporting server 100 executes to cancel the right. Accordingly, the other users may become to perform a handwriting input by acquiring the access right of the area, whereby discussion and information exchange can be performed simply and efficiently.

Still moreover, in the case where two or more areas provided with respective write permissions adjoin each other, a handwriting input can be continuously performed over a range of the two or more areas. Accordingly, even in the case where the respective write permissions of the adjoining areas are different in kind (for example, a area having been provided with a personal right of a user and a area having been provided with a group right of a group to which the user belong), if the user has respective write permissions for the both areas, the user can perform the handwriting input appropriately without discontinuous. Further, in the case where a handwriting input is performed over a range of two or more areas, only a user having respective write rights for the both areas is allowed to delete the handwriting data. Accordingly, it becomes possible to prevent problems that the handwriting data are deleted by a user having only a right on one side without permission.

In addition, in the case where a part or the whole of a determined area overlaps with an area whose access right is acquired by another, "a right grant waiting queue" is prepared for the overlapped area and an access right requested to be granted is registered. Accordingly, an access right can be acquired without re-determining the area, whereby it becomes possible to improve the convenience of users.

The present invention should not be limited to the above-mentioned examples, because the structure and control in the embodiments can be modified appropriately unless the modification deviates from the intent of the present invention.

The invention claimed is:

1. A conference supporting system comprising:
a plurality of input terminals connected to a network for sharing data with each other and displaying data thereon, the input terminals each comprising a processor and a display screen configured to allow a user to perform a handwriting input thereon and to display the data; and
a control apparatus connected to the plurality of the input terminals through the network and comprising a processor,
wherein the processor of each of the input terminals is configured to perform
a right choosing process including
enabling the user of the each of the input terminals to choose, with regard to an area where a handwriting is to be performed in the display screen, whether the user gets a writing access right to the area or a group to which the user belongs gets the writing access right to the area so that one or more members other than the user in the group can also write in the area,
a right acquiring process including
transmitting information about the area determined by the user and information about the writing access right chosen by the user to the control apparatus, and
making a request to acquire the writing access right to the control apparatus, and
a handwriting inputting process including
transmitting handwriting data which has been inputted in the area in the display screen to the control apparatus, the area being the area whose writing access right has been acquired by the user or the group to which the user belongs,
the processor of the control apparatus is configured to perform:
a right granting process including
comparing, in response to the request to acquire the writing access right made by one of the input terminals, the area determined by the user and the area whose writing access right has already been acquired by another,
granting a writing access right of a part or whole of the area determined by the user, the part or whole of the area not overlapping with the area whose writing access right has already been acquired by another, and
giving the one of the input terminals a notice that the writing access right of the part or whole of the area has been granted, and a data distributing process including
transmitting the handwriting data transmitted from the one of the input terminals to other input terminals and
operating the display screen of each of the other input terminals to display the handwriting data.

2. The conference supporting system of claim 1,
wherein the processor of each of the input terminals is configured to perform the right choosing process, the right choosing process further including operating the display screen of the each of the input terminals to display a list including the user and one or more groups to which the user belongs so as to allow the user to choose at least one of the user and the one or more groups.

3. The conference supporting system of claim 1,
wherein the processor of each of the input terminal is configured to perform the right acquiring process, the right acquiring process further including operating the display screen of the each of the input terminals to designate the area whose writing access right has been granted to the user or the group by the control apparatus in response to receiving the notice given by the control apparatus.

4. The conference supporting system of claim 3,
wherein the processor of each of the input terminal is configured to perform the right acquiring process, the right acquiring process further including operating the display screen to display the area whose writing access right has been granted to the user and the area whose writing access right has been granted to the group to be distinguishable from each other.

5. The conference supporting system of claim 1,
wherein the processor of each of the input terminal is configured to perform the handwriting input process, the handwriting input process further including, in response to a detection of a handwriting input performed on the display screen, determining coordinates at which the handwriting input is performed on the display screen and sending the control apparatus a request to grant writing permission of the handwriting input process to the user and the group, and
the processor of the control apparatus is configured to perform an exclusive judging process in response to receiving the request to grant the write permission, the exclusive judging process including
granting the writing permission to the user or the group under a condition that the coordinates fall in the area whose writing access right has been acquired by the user or the group and that an handwriting input is not performed on one of the input terminals, the one of the input terminals being used by another user belonging to the group.

6. The conference supporting system of claim 1,
wherein the processor of the control apparatus is configured to perform the right granting process, the right granting process further including
registering information of a part or whole of the area determined by the user and the information of the writing access right into a right grant waiting queue, the part or whole of the area not overlapping with the area whose writing access right has already been acquired by another, and
in response to receiving a request to cancel an access right of the area whose writing access right has already been acquired by another, deleting the writing access right of the area whose writing access right has already been acquired by another and then granting an writing access right to the user or the group in accordance with the right grant waiting queue.

7. The conference supporting system of claim 1,
wherein the processor of the control apparatus is configured to perform the right granting process, the right granting process further including
on granting a writing access right to the group, notify an area whose writing access right has been granted to the group to input terminals used by other users belonging to the group.

8. An input terminal to be connected to a network for sharing data with another input terminal and displaying the data thereon with being controlled by a control apparatus, the input terminal comprising a processor and a display screen configured to allow a user to perform handwriting input thereon and to display the data thereon,
the processor being configured to perform
a right choosing process including
enabling the user of the input terminal to choose, with regard to an area where a handwriting is to be performed in the display screen, whether the user gets a writing access right to the area or a group to which the user belongs gets the writing access right to the area so that one or more members other than the user in the group can also write in the area,
a right acquiring process including
transmitting information about the area determined by the user and information about the writing access right chosen by the user to the control apparatus, and
making a request to acquire the writing access right to the control apparatus, and
a handwriting inputting process including
transmitting handwriting data which has been inputted in the area in the display screen to the control apparatus, the area being the area whose writing access right has been acquired by the user or the group to which the user belongs.

9. The input terminal of claim 8,
wherein the processor is configured to perform the right choosing process, the right choosing process further including
operating the display screen to display a list including the user and one or more groups to which the user belongs so as to allow the user to choose at least one of the user and the one or more groups.

10. The input terminal of claim 8,
wherein the processor is configured to perform the right acquiring process, the right acquiring process further including
operating the display screen to designate the area whose writing access right has been granted to the user or the group by the control apparatus in response to receiving notice given by the control apparatus.

11. The input terminal of claim 8,
wherein the processor is configured to perform the right acquiring process, the right acquiring process further including operating the display screen to display the area whose writing access right has been granted to the user and the area whose writing access right has been granted to the group to be distinguishable from each other.

12. A control apparatus to be connected to a plurality of input terminals through a network, the input terminals each including a display screen configured to allow a user to perform handwriting input thereon and to display the data thereon, the control apparatus comprising a processor configured to perform a right granting process including
- receiving information about an area determined by the user of one of the input terminals and information about a writing access right chosen by the user, both being transmitted from the one of the input terminals, the information about the writing access right being obtained by enabling the user to choose whether the user or a group to which the user belongs, including one or more member other than the user, gets a writing access right of the area determined by the user,
- comparing, in response to receiving the information about the area determined by the user and the information about the writing access right, the area determined by the user and the area whose writing access right has already been acquired by another,
- granting a writing access right of a part or whole of the area determined by the user to the user or the group so that the one or more members, other than the user in the group, can also write in the area, the part or whole of the area not overlapping with the area whose writing access right has already been acquired by another, and
- giving the one of the input terminals a notice that the writing access right of the part or whole of the area has been granted, and a data distributing process including
- receiving handwriting data which has been inputted in an area in the display screen of the one of the input terminals, the area being the area whose writing access right has been acquired by the user or the group to which the user belongs,
- transmitting the handwriting data to other input terminals and
- operating the display screen of each of the other input terminals to display the handwriting data.

13. The control apparatus of claim 12,
wherein the processor is configured to perform an exclusive judging process in response to receiving a request to grant writing permission sent by one of the input terminals with determining coordinates at which a handwriting input is performed on the display screen of the one of the input terminals, the exclusive judging process including
- granting the writing permission to the user and the group under a condition that the coordinates fall in the area whose writing access right has been acquired by the user or the group and that the handwriting input is not performed on one of the input terminals, the one of the input terminals being used by another user belonging to the group.

14. The control apparatus of claim 12,
wherein the processor is configured to perform the right granting process, the right granting process further including
- registering information of a part or whole of the area determined by the user and the information of the writing access right into a right grant waiting queue, the part or whole of the area not overlapping with the area whose writing access right has already been acquired by another, and
- in response to receiving a request to cancel a writing access right of the area whose access right has already been acquired by another, deleting the writing access right of the area whose writing access right has already been acquired by another and then granting a writing access right to the user or the group in accordance with the right grant waiting queue.

15. The control apparatus of claim 12,
wherein the processor is configured to perform the right granting process, the right granting process further including
- on granting the writing access right to the group, notifying the area whose writing access right has been granted to the group to input terminals used by other users belonging to the group.

16. The conference supporting system of claim 1,
wherein the right acquiring process further includes
canceling the writing access right of the area whose writing access right has already been acquired by a member other than the user in the group, when the area determined by the user for the group to which the user belongs gets overlaps the part or the whole of the area whose writing access right has already been acquired by the member other than the user in the group, and
granting the writing access right of the determined area by the user to the group.

17. The control apparatus of claim 12,
wherein the right acquiring process further includes
canceling the writing access right of the area whose writing access right has already been acquired by a member other than the user in the group, when the area determined by the user for the group to which the user belongs gets overlaps the part or the whole of the area whose writing access right has already been acquired by the member other than the user in the group, and
granting the writing access right of the determined area by the user to the group.

\* \* \* \* \*